C. A. Schultz,
Sawing Stone.

N° 14,471.    Patented Mar. 18, 1856.

AM. PHOTO-LITHO. CO. N.Y. (OSBORNE'S PROCESS)

UNITED STATES PATENT OFFICE.

C. A. SCHULTZ, OF CHICAGO, ILLINOIS.

MACHINE FOR SAWING MARBLE IN TAPER FORM.

Specification of Letters Patent No. 14,471, dated March 18, 1856.

*To all whom it may concern:*

Be it known that I, C. A. SCHULTZ, of Chicago, in the county of Cook and State of Illinois, have invented a new and useful Improvement in Marble-Sawing Machinery; and I do hereby delclare that the following is a full, clear, and exact description of the construction and operation of the same, reference being had to the annexed drawing, forming part of this specification, in which—

Figure 1:
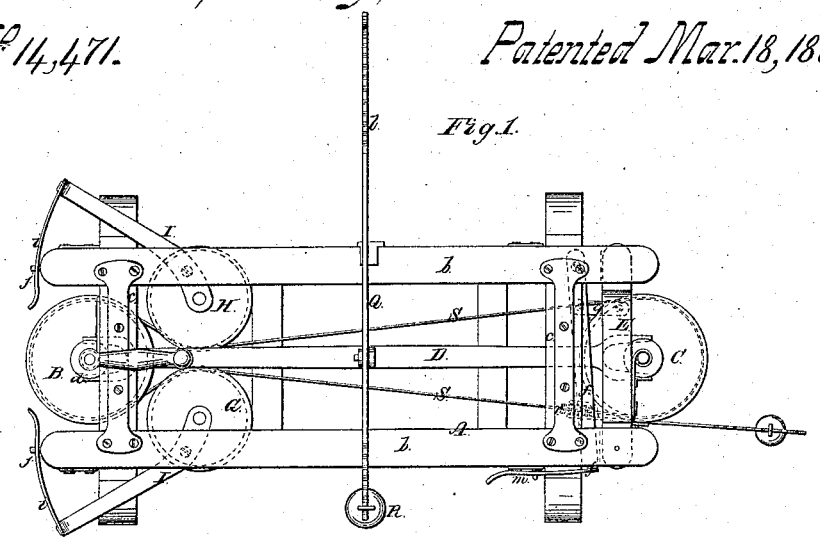
Figure 2:
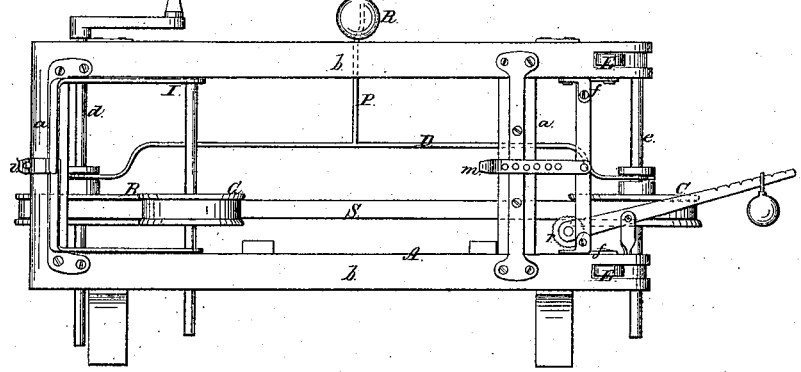
Figure 3:
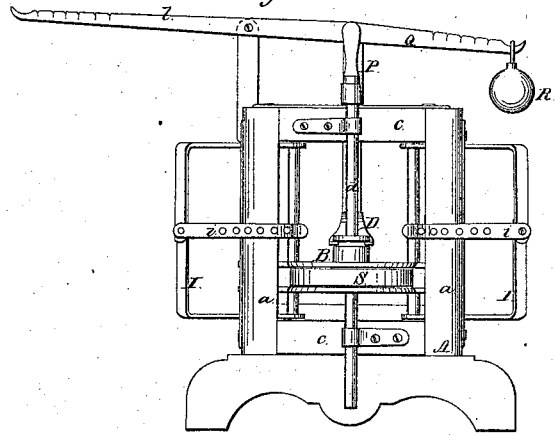

Figure 1 is a top view of the machine. Fig. 2 is a side elevation. Fig. 3 is an end elevation.

Similar characters of reference denote the same part.

The object of my invention is the taper sawing of opposite sides of a block of marble at one operation; which I effect by a belt saw, arranged and adjusted as hereinafter set forth: the invention consisting in the mode of adjusting said saw.

In the drawing A represents the frame of the machine, consisting of uprights $a$, longitudinal pieces $b$, and cross pieces $c$. The saw S passes around two horizontal pulleys B and C, where shafts $d$ and $e$ are movable vertically in direction of their length by reason of cross head connection D. The pulley B has no lateral movement, but C has its shaft hung upon two levers E, moved by means of levers $f$ and rods $g$ as will be described. Besides pulleys B and C there are two pulleys G and H, each swung in a lever frame I so as to press upon the saw S. The shafts $h$ of these pulleys have a longitudinal motion in the eyes of the lever frames through which they pass. These lever frames are held in position by means of the straps $i$ and pins $j$. The cross head D is connected by rod P with the lever Q; the weight R on which serves to give the saw its downward movement during the sawing operation, and power applied to arm $l$ serves to elevate the same. The cut roller $r$ is held against the under edge of the saw to give it an edge suitable for cutting.

The operation of the machine is as follows: The roller C is adjusted by means of lever $f$ to stretch the saw moderately, and pulleys G and H are forced against the saw sufficient to give both branches the desired inclination; the straps $i$ holding the lever frames I in the desired position. If any additional tension of saw is required, the further outward movement of pulley C by levers $f$ will accomplish it; the spring strap or brace $m$ holding it in position, as in Figs. 1 and 2. After giving both branches of the saw the requisite inclination, the system of pulleys carrying the saw is elevated far enough to admit the block, and the weight R adjusted so as to give the system a downward tendency; power is applied to shaft $d$, moving the two branches of saw S in opposite directions. This movement of the saw makes two cuts in the block, into which the saw sinks as it progresses. The small roller $r$ keeps the under edge of the saw in a rough and cutting condition, acting as a file. A small stream of water may be directed upon the saw as it leaves the cut, to prevent heating. Water will moreover be used in the cut as in other sawing machines.

The spring strap braces $i$ may be so graduated as to give certain inclinations of the saw for given positions of lever frames; these details need not be here dwelt upon as they are the mere carrying out of the adjustment here given.

What I claim as new and of my own invention, is—

Adjusting the said saw by means of the swinging pulleys acting laterally upon it, combined as herein described with the pulley regulating the tension, the several parts being arranged and operated substantially as specified.

In testimony whereof, I have hereunto signed my name before two subscribing witnesses.

CHARLES A. SCHULTZ.

Witnesses:
JOHN L. SMITH,
JAS. D. CLARY.